Feb. 18, 1930.  V. F. RIDGWAY  1,747,486
DISPLAY BOX
Filed March 5, 1927   3 Sheets-Sheet 1
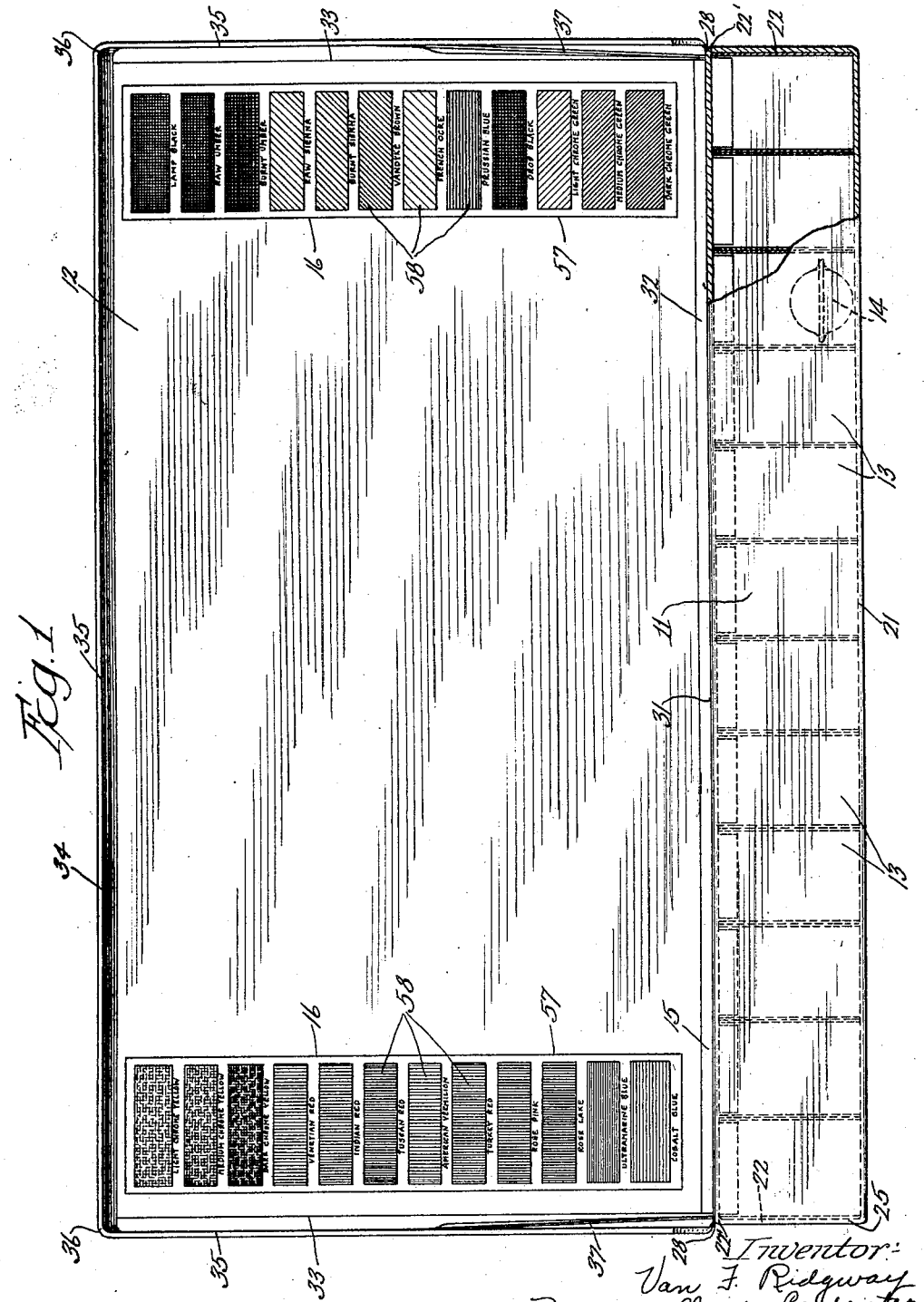

Feb. 18, 1930.  V. F. RIDGWAY  1,747,486
DISPLAY BOX
Filed March 5, 1927  3 Sheets-Sheet 2
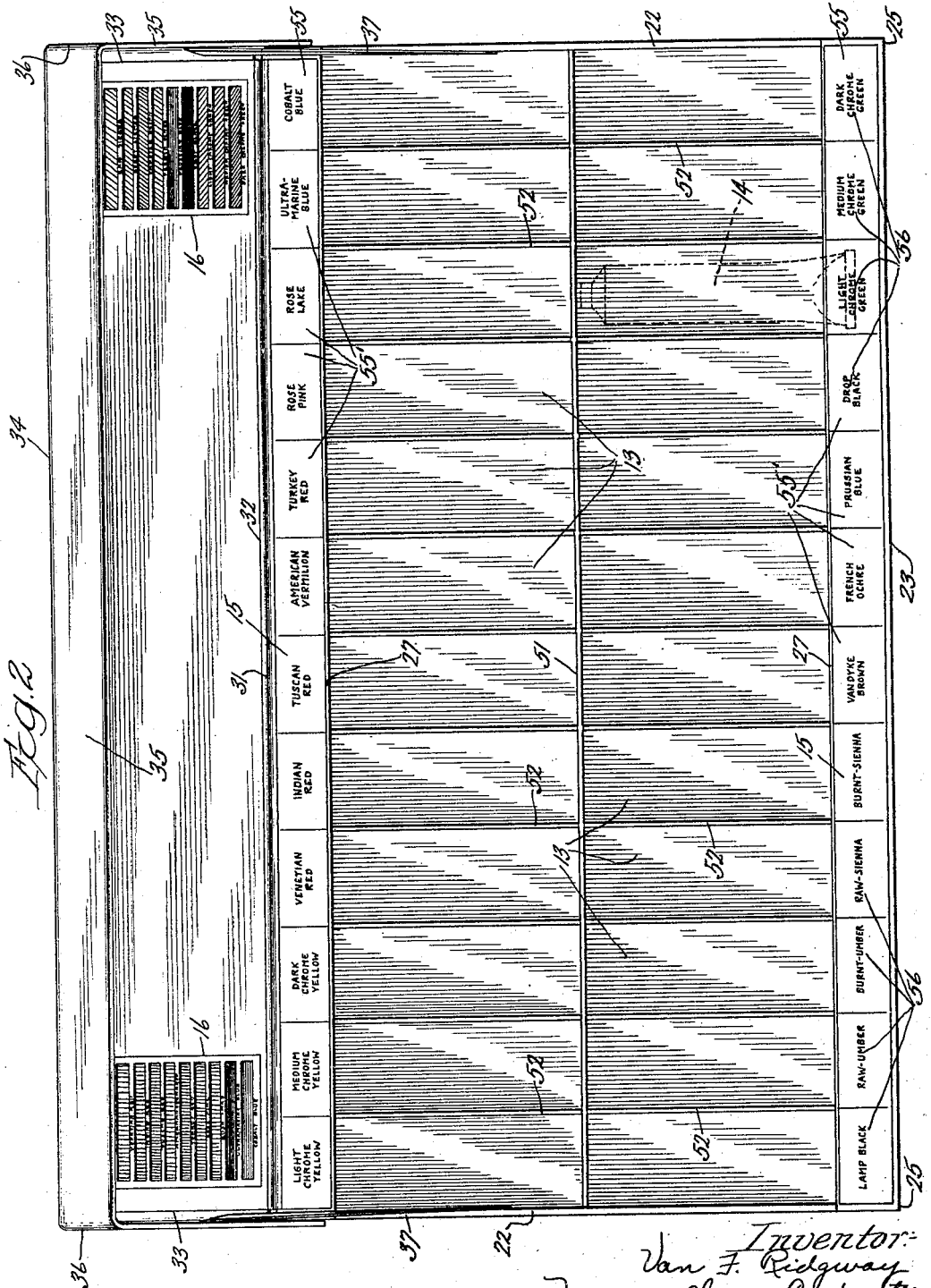

Feb. 18, 1930. V. F. RIDGWAY 1,747,486
DISPLAY BOX
Filed March 5, 1927 3 Sheets-Sheet 3
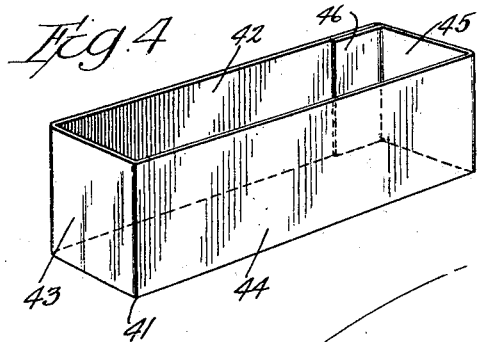
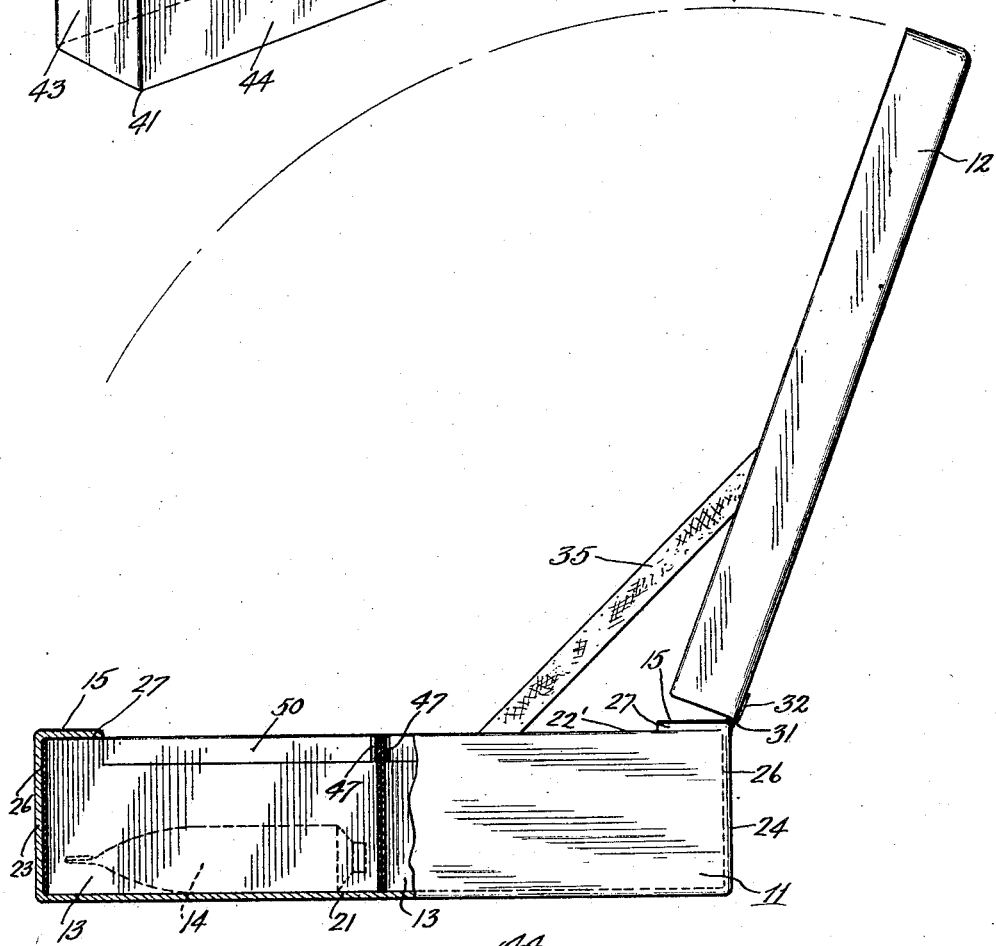
Inventor:
Van F. Ridgway
By Munday, Clarke & Carpenter
Attys Patented Feb. 18, 1930

1,747,486

UNITED STATES PATENT OFFICE

VAN F. RIDGWAY, OF CHICAGO, ILLINOIS

DISPLAY BOX

Application filed March 5, 1927. Serial No. 173,151.

The invention relates in general to display boxes and more particularly to a display box for paints having a color chart conveniently arranged within the box lid to provide conspicuous illustration of the colors of the pigments contained in the box.

Boxes of this general nature are used to display paints or pigments and act as silent salesmen in promoting the sale of the paints. The box, when closed comprises a compact parcel which may be readily stored or transported from place to place. When open, the box provides a sightly display rack adapted for support upon any convenient mounting where it may be seen. The utility of such a box depends upon its power to attract the inspection of prospective customers and to quickly show the exact nature of its contents. The utility of a display box in which paints are stored in assorted arrangement according to color, is greatly increased by the provision of means for clearly illustrating the colors of the various pigments in the box, so that the exact color of the paints available is discernible at a glance.

The principal object of the invention is the provision of a display box having compartments for the storage of paints and having means whereby the exact colors of the paints stored in the various compartments may quickly and easily be determined.

Another important object of the invention is the provision of a neat paint display box having color charts conspicuously mounted in the lid of the box for the purpose of clearly showing what paint colors are available.

Another important object of the invention is the provision of a paint display box having improved partitions which brace the box and render it strong and rigid and thus reduce damage due to rough usage during transportation or storage.

Numerous other objects of the invention will be apparent as it is better understood from the following description, which, taken in connection with the accompanying drawings, discloses a preferred embodiment thereof.

Referring to the drawings:

Figure 1 is a front view of a paint display box embodying my present invention, parts of the box being shown in section to illustrate details of construction;

Fig. 2 is a plan view thereof;

Fig. 3 is a side view thereof, the box being shown in open position and having parts shown in section to illustrate details of construction;

Fig. 4 is a perspective view of a compartment for the display box; and

Fig. 5 is an enlarged perspective view illustrating the method of fastening individual compartments together to provide strong partitions within the display box.

To illustrate my invention I have shown on the drawings a display box for paints. The display box comprises a box 11 having a lid 12, and is divided into compartments 13 which are adapted to accommodate paint containers 14 of standard size and shape. Each compartment is labeled in a unique manner with the reference name of the paint it contains. The compartments are labeled in a certain color sequence by means of strip labels 15 which are so arranged that a different reference name is positioned opposite each compartment. Color charts 16, illustrating the paint colors corresponding to the reference names on the strip labels are positioned in the lid 12 of the box in such a manner as to be clearly visible when the box is open. The chart colors are arranged in the same color sequence as are the reference names of the strip labels and this feature makes it a simple matter to locate any desired paint color in the box.

The box 11 is constructed of a single sheet of cardboard or other suitable box material cut to proper shape and bent into box form. The box has a rectangular bottom wall 21, integral side walls 22 bent upwardly at right angles, and integral front and rear walls 23 and 24 bent upwardly at right angles from the bottom wall. The front and rear walls have ends 25 engaging front and rear edges 26 of the side walls 22 and secured thereto. The upper edges of the front and rear walls 23 and 24 are provided with integral flange portions 27 extending inwardly therefrom and having ends 28 engaging front and rear upper edge portions 22' of the side walls 22. The adjoining edges of the front, rear and side walls and of the inturned flanges 27 and the side walls are secured together in any convenient manner, such as by gluing. The outer surfaces of the walls and bottom of the box are covered with paper of suitable color and texture which is glued to the box to provide a sightly finish therefor.

The lid 12 of the box comprises a sheet of cardboard 28 or similar material adapted to fit over and cover the top of the box 11. This sheet of cardboard is properly cut to provide a rectangular portion having a lower edge 31 secured to the upper rear edge of box 11 by means of two strips of gummed linen 32. The strips have portions engaging parts of the box adjacent the upper rear horizontal edge thereof. A front strip is secured along the lower edge of the front face of the lid and along the upper face of the rear flanged portion 27. The other strip is fastened along the lower edge of the rear face of the lid and along the upper edge of the rear wall 24 of the box. The flexibility of the strips provides hinged attachment between lid and box. The lid has side edges 33 and a front or top edge 34 and is provided with integral flanged portions 35 bent therefrom along the edges 33 and 34. These flanges are secured together at their adjacent edges 36 and are adapted to embrace the upper edges of the front and side walls of the box when the lid is closed and so to provide a secure package. The lid 12 is covered with paper glued to the outer surfaces thereof in order to provide a sightly finish for the lid.

Tapes 37 to limit the opening of the lid 12 are provided at each side of the display box and are fastened between the side walls 22 of the box and the side flanges 35 of the lid. When the box is opened up for display purposes the tapes provide means for sustaining the lid in substantially vertical position to display the color charts mounted on the inner face thereof.

Each compartment 13 is made from a single strip of cardboard 41 and comprises a side wall 42, an end wall 43 bent therefrom at right angles, another side wall 44 parallel to side wall 42 and bent at right angles from wall 43, and an end wall 45 parallel to and opposite end wall 43 and bent from wall 44. End wall 45 is provided with an inturned flange 46 at its free edge which engages the inner surface of side wall 42 at the free end thereof. Flange 46 is secured to side wall 42 in any convenient manner and provides the compartment with continuous walls. It is plain that the compartment may be made in a number of different ways without departing from the spirit or scope of this invention. It is not necessary to form the compartment from a single strip but the walls may be made of individual rectangular sheets, and the compartment may be provided with a bottom wall either integral with the strip 41 or separate therefrom. The compartments 13 are secured together and arranged in a double row to provide a unitary rectangular partitioned insert. This insert has overall dimensions equal to the interior dimensions of the box 11 and is adapted for positioning therein to provide a plurality of compartments in the box. Each row of the unitary insert comprises a plurality of compartments 13 arranged adjacently and having adjacent sides 42 and 45 in engaging contact. The rear ends 45 of the compartments comprising the front row are in engaging contact with the front ends 43 of the corresponding compartments of the rear row. The compartments are of such length that the insert snugly engages between front and rear walls 23 and 24 of the box 11. The compartments of the insert are secured together by folded strips of gummed linen which are fastened to the adjacent upper edges of the walls of the compartments. A single strip of linen 46 of length equal to the distance between side walls 22 of the box is secured to the upper edges of adjacent end walls 43 and 45 of the compartments. The strip 46 is folded to provide downwardly disposed flanges 47 which embrace the inner faces of adjacent end walls 43 and 45, and which fasten the two rows of compartments together. These flanges have registering cut-out portions 48 provided at intervals therealong to accommodate the side walls of the adjacent compartments which extend therethrough from the end walls. The side walls of adjacent compartments are similarly secured by strips of linen 49 folded to provide downwardly disposed flange portions 50 which embrace and which are fastened to the upper edges of the inner faces of the side walls of adjacent compartments and which secure adjacent compartments together. The insert is placed in the box 11 before the flanges 27 are bent inwardly from the front and rear walls 23 and 24. The adjacent end walls 43 and 45 of the front and rear row of the compartments provide a continuous vertical partition 51 extending between the side walls 22 of the box and parallel with and midway between the front and rear walls of the box while the adjacent side walls 42 and 44 provide a plurality of front to rear partitions 52 for the box. After the insert has been properly positioned within the box, the flanges 27 are bent down and secured at each end to the end walls 22 of the box. The flanges 27 thus embrace the front and rear walls, and portions of the front to rear partitions of the insert, and secure the partitioned insert firmly in place within the box 11. This method of construction allows the compartments to be formed independently of the main box 11, which may be built to accommodate any even number of compartments. The compartments were assembled separately, secured together and positioned in the box as a unitary insert. The partitions 51 and 52 comprise a double thickness of cardboard and provide great strength and rigidity in the cardboard box itself, and thus eliminate damage to the box during transportation or storage.

Strips of paper 55 are secured to the upper face of the flange portions 27 of the box and extend therealong between opposed side walls 22 of the box. Each compartment in the box is thus provided with a strip portion 55' thereover, and a paint identifying name 56 is printed on each strip portion. The strip portions 55' and the names 56 comprise compartment labels which identify the color of the paint stored in the compartments immediately thereunder, and the individual strip portions 55' of the front and rear compartments comprise integral strip labels 15 which identify the paints in the front and rear compartments.

In order to provide a simple means for illustrating the color of the paints in the various compartments of the box, I provide color charts 16 which are secured to the inner face of the box lid 12. The charts comprise two base strips 57 mounted in the lid parallel with and adjacent to the lateral edges 33 thereof. The base strips extend across the face of the lid between its horizontal edges 31 and 34 and provide a mounting for a plurality of color strips 58 which are secured thereon in spaced relationship. The identifying name of the color represented by each color strip 58 is printed immediately adjacent thereto upon the base strip 57. The color strips 58 are arranged upon the base strips in a color sequence corresponding to that of the paint identifying names printed on the label strips 15, so that one color chart illustrates in order the paints contained in the front row of compartments while the other color chart illustrates the colors of paints contained in the rear row.

The box provides a sightly display device for paints having means whereby the color of the paints is at all times plainly shown. Moreover the box when closed provides a compact and strong package which may be stored or transported without danger of injury to its contents.

It is thought that the invention and many of its attendant advantages will be understood from the foregoing description, and it will be apparent that many changes may be made in the form, construction and arrangement of the parts without departing from the spirit and scope of the invention or sacrificing all of its material advantages, the form hereinbefore described being merely a preferred embodiment thereof.

I claim:

1. A paint display box, comprising a box, said box having vertical front, rear and side walls, and a bottom wall, and inturned flange portions bent from the upper edges of said front and rear walls, a lid for said box, said lid being hinged to the upper edge of said rear wall and having means engaging therewith for supporting said lid in a substantially vertical plane when said box is open, a plurality of partitioned inserts mounted in said box, each being complete in itself having portions engaging beneath said front and rear flanged portions which hold said partitioned inserts in place in said box, said partitioned inserts providing a plurality of compartments adapted to display paint containers containing paints and adjacently arranged within the box in front and rear rows, strip labels secured to the upper faces of said front and rear inturned flanged portions and having label portions adjacent the compartments in said front and rear rows, each said label portions having a paint identifying color name impressed thereon, to identify the paint displayed in the compartment immediately adjacent thereto, and color charts, comprising a plurality of rectangular colored strips, mounted in the inner face of said lid and parallel and adjacent to the side edges thereof for illustrating in order the colors represented by each said color name on said strip labels.

2. A display box structure, comprising a sheet of box forming material, flanged at its front and rear and side edges to constitute a box body, having a bottom and front, rear and side vertical walls, the front and rear walls being respectively rebent horizontally to provide continuous label supports extending from side to side at the front and rear of the box body, and a compartment structure for said box body made of a plurality of individual compartment members having side and end walls assembled to form rows of contiguous compartments and securing strip members bent over and engaging walls of adjacent compartment members to secure them together.

3. A display box structure, comprising a box body divided into a plurality of rows of compartments for the display of different colored articles, strip labels companion to the respective rows having individual identifications for the individual compartments and a lid for the box body provided with colored charts appertaining respectively to the rows of compartments and arranged with the colors of said charts corresponding serially with the colors of the articles in said compartments.

4. A display box structure, comprising a box body divided into a plurality of compartments for the display of different colored articles and a lid for the box body provided with colored charts appertaining respectively to said compartments and arranged with the colors corresponding serially with the colors of the articles in said compartments.

VAN F. RIDGWAY.